United States Patent Office 3,122,535
Patented Feb. 25, 1964

3,122,535
5-NITRO FURFURYLIDENE-D-GLUCOSAMINE, AND PROCESS OF MAKING SAME
Friedrich Krueger, Mannheim-Lindenhof, Germany, assignor to Joh. A. Benckiser G.m.b.H. Chemische Fabrik, Ludwigshafen (Rhine), Germany, a corporation of Germany
No Drawing. Filed May 25, 1962, Ser. No. 197,606
Claims priority, application Germany June 2, 1961
1 Claim. (Cl. 260—211)

The present invention relates to new 5-nitro furfural derivatives and more particularly to 5-nitro furfurylidene-D-glucosamine, and to a process of making and using the same.

It is known that reaction products of 5-nitro furfural with semicarbazide and other compounds exhibit considerable antibacterial activity as has been observed by Dodd and Stilman in 1944.

Of the many 5-nitro furfural derivatives which have been prepared subsequently to this discovery the 5-nitro furfural semicarbazone, i.e. the first compound which had been clinically tested, is still of importance, especially as topically applied therapeutic agent. However, this compound is rather toxic, and therefore, many attempts have been made to produce derivatives of 5-nitro furfural with decreased toxicity.

It is one object of the present invention to produce a 5-nitro furfural compound which has a higher antibacterial activity as said semicarbazone and which, in addition thereto, possesses a much lower toxicity.

Another object of the present invention is to provide a process of making such a new and valuable 5-nitro furfural derivative.

Still another object of the present invention is to provide pharmaceutical compositions useful in therapy which contain such a new 5-nitro furfural compound as active ingredient.

Still another object of the present invention is to provide a method of combating infections caused by bacteria by administration of the new 5-nitro furfural derivative according to the present invention.

Other objects of present invention and advantageous features thereof will become apparent as the description proceeds.

In principle, the new 5-nitro furfural compound according to the present invention which is characterized by a very high antibacterial activity and a surprisingly low toxicity is the reaction product of 5-nitro furfural with D-glucosamine. The following table shows that the 5-nitro furfurylidene-D-glucosamine according to the present invention possesses remarkably high antibacterial activity. The compound was compared with 5-nitro furfural semicarbazone by the agar plate method against various microorganisms. Polyethylene glycol was used as diluting agent.

TABLE I

| Compound used in the nutrient medium | Conc., percent | Diameter of zone of inhibition against | | | |
|---|---|---|---|---|---|
| | | Trichophyton metagraphytes | Staphylococcus aureus | Candida albicans | Aspergillus niger |
| 5-Nitro furfurylidene-D-glucosamine | 0.2 | 10 | 11 | 3 | 3 |
| | 0.1 | 8 | 8 | 0 | 0 |
| | 0.075 | 6 | 7 | 0 | 0 |
| | 0.05 | 4 | 6 | 0 | 0 |
| 5-Nitro furfural semicarbazone | 0.2 | 5 | 7 | 0 | 0 |
| | 0.1 | 1 | 5 | 0 | 0 |
| | 0.075 | 0 | 4 | 0 | 0 |
| | 0.05 | 0 | 4 | 0 | 0 |

It is evident that 5-nitro furfurylidene-D-glucosamine has a considerably higher inhibitory effect upon bacteria as well as pathogenic fungi than 5-nitro furfural semicarbazone.

The 5-nitro furfurylidene-D-glucosamine according to the present invention is prepared by reacting preferably equimolecular amounts of D-glucosamine and 5-nitro furfural. It is of advantage to use, in place of D-glucosamine base, its hydrochloride. Preferably, glucosamine hydrochloride is dissolved in water and an alcoholic solution of 5-nitro furfural is admixed to said solution. A weakly alkaline agent, such as sodium bicarbonate is then added gradually to the mixture until the free glucosamine base is formed which reacts with the 5-nitro furfural.

This method of producing the new compound has the advantage that it is possible to use glucosamine hydrochloride without first having to isolate the free glucosamine base.

The reaction is always carried out in solvents which are miscible with water such as ethanol, methanol, dioxane, tetrahydrofuran, acetone, and others at a temperature below 50° C. and preferably at room temperature. Thereby, one mole of glucosamine reacts with one mole of 5-nitro furfural whereby water is split off and the Schiff's base is formed according to the following equation.

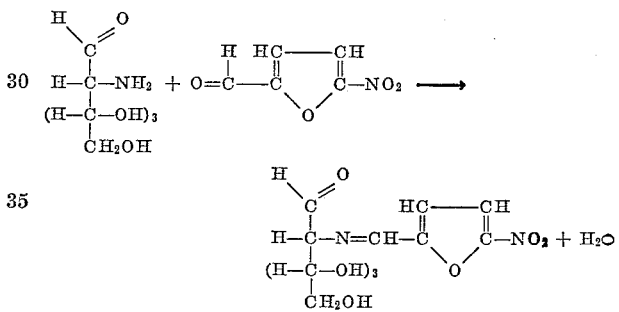

The following examples serve to illustrate the present invention without, however, limiting the same thereto.

*Example 1*

A soluion of 3.6 g. of D-glucosamine in 10 cc. of water and a solution of 2.8 g. of 5-nitro furfural in 20 cc. of ethanol are poured together. After a short period of time, 5-nitro furfurylidene-D-glucosamine precipitates in crystalline form. It is washed with alcohol and water and is then sufficiently pure for analysis. Melting point: 170–176° C. (with decomposition). Yield: 55% of the theoretical yield.

*Analysis.*—Calculated: 43.73% C; 4.67% H; 9.27% N. Found: 43.79% C; 4.80% H; 9.41% N.

*Example 2*

A solution of 21.5 g. of D-glucosamine hydrochloride in 80 cc. of water and a solution of 13.9 g. of 5-nitro furfural in 50 cc. of ethanol are combined and 8.4 g. of sodium bicarbonate are added thereto portion by portion. After a short period of time, 5-nitro furfurylidene-D-glucosamine precipitates in crystalline form. It is washed with ethanol and water and is then sufficiently pure for analysis. The new compound is readily soluble in dimethyl formamide, moderately soluble in water, and insoluble in ethanol.

The 5-nitro furfurylidene-D-glucosamine has proved of value on topical application, for instance, in the form of an ointment, and has proved to be of considerable value in the prophylaxis or treatment of surface infections of traumatic and operative wounds. For this purpose it may be applied dissolved in an anhydrous polyethylene glycol base or other water soluble or waterdispersible ointment base. It may also be used for the treatment of bacterial otitis media et externa, external ophthalmic bacterial infections, and other surface infections.

Oral administration is also possible with the new compound because, in contrast to 5-nitro furfural semicarbazone, it is rather non-toxic.

Of course, many changes and variations in the reaction conditions, temperature and duration, in the solvents used, in the alkaline agents added, in the methods of working up and of purifying the reaction product, and the like may be made by those skilled in the art in accordance with the principles set forth herein and in the claim annexed hereto.

I claim:
5-nitro furfurylidene-D-glucosamine.

References Cited in the file of this patent
UNITED STATES PATENTS
2,808,403   Kagan ———————— Oct. 1, 1957